US011728995B2

(12) United States Patent
Swamidurai

(10) Patent No.: US 11,728,995 B2
(45) Date of Patent: Aug. 15, 2023

(54) REWARD POINT TRANSFERS USING BLOCKCHAIN

(71) Applicant: American Express Travel Related Services Company, Inc., New York, NY (US)

(72) Inventor: Vasudevan Swamidurai, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 193 days.

(21) Appl. No.: 15/948,834

(22) Filed: Apr. 9, 2018

(65) Prior Publication Data

US 2019/0311392 A1 Oct. 10, 2019

(51) Int. Cl.
*H04L 9/32* (2006.01)
*G06Q 30/0226* (2023.01)
(Continued)

(52) U.S. Cl.
CPC ....... *H04L 9/3239* (2013.01); *G06Q 30/0227* (2013.01); *H04L 9/50* (2022.05);
(Continued)

(58) Field of Classification Search
CPC ..... G06Q 30/0227; H04L 9/3239; H04L 9/50; H04L 63/0442; H04L 63/123; H04L 9/0825; H04W 12/12
See application file for complete search history.

(56) References Cited

U.S. PATENT DOCUMENTS 8,265,993 B2 * 9/2012 Chien ............... G06Q 20/04
705/14.33
8,676,642 B1 * 3/2014 Sheley ............. G06Q 30/0234
705/14.24

(Continued)

FOREIGN PATENT DOCUMENTS

WO 20170136956 8/2017
WO WO-2017136956 A1 * 8/2017 ........... H04L 9/0637
WO 2018064645 4/2018

OTHER PUBLICATIONS

Zuo, Long; Xiong, Shuo; Iida, Hiroyuki; "An analysis of hotel loyalty program with a focus on the tiers and points system," 2017 4th International Conference on Systems and Informatics (ICSAI), Hangzhou, China, 2017, pp. 507-512, doi: 10.1109/ICSAI.2017.8248345.*

(Continued)

*Primary Examiner* — Victor Lesniewski
(74) *Attorney, Agent, or Firm* — Thomas | Horstemeyer, LLP

(57) ABSTRACT

A reward points transfer system and process using blockchain is disclosed. Transaction account issuers may write reward transfer messages to the blockchain to initiate a transfer of reward points for a transaction account holders account to one or more rewards partners. Rewards partners may retrieve the reward transfer messages from the blockchain, and write a reward transfer response message to the blockchain to confirm receipt of the reward points transfer and to update the status of the transfer. The transaction account issuers and rewards partners may encrypt the messages and generate hashes based on the messages prior to writing to the blockchain, to ensure that the messages are not tampered with during the transfer process.

20 Claims, 5 Drawing Sheets

(51) Int. Cl.
*H04L 9/40* (2022.01)
*H04L 9/00* (2022.01)
*H04W 12/12* (2021.01)

(52) U.S. Cl.
CPC ........ H04L 63/0442 (2013.01); H04L 63/123 (2013.01); *G06Q 2220/00* (2013.01); *H04W 12/12* (2013.01)

(56) References Cited

U.S. PATENT DOCUMENTS

| | | | | |
|---|---|---|---|---|
| 8,682,791 | B2* | 3/2014 | Bies | G06Q 20/06 |
| | | | | 705/41 |
| 8,783,563 | B1* | 7/2014 | McGhie | G06Q 30/0227 |
| | | | | 235/487 |
| 9,785,912 | B2 | 10/2017 | Quezada | |
| 2002/0178354 | A1 | 11/2002 | Ogg | |
| 2006/0253320 | A1* | 11/2006 | Heywood | G06Q 30/02 |
| | | | | 705/14.18 |
| 2010/0312629 | A1* | 12/2010 | Wolf | G06Q 20/28 |
| | | | | 705/14.27 |
| 2011/0022448 | A1* | 1/2011 | Strock | G06Q 30/0241 |
| | | | | 705/14.1 |
| 2011/0191159 | A1* | 8/2011 | Heitman | G06Q 30/0235 |
| | | | | 705/14.35 |
| 2012/0010937 | A1* | 1/2012 | Hanson | G06Q 30/0226 |
| | | | | 705/14.1 |
| 2012/0166264 | A1* | 6/2012 | Shum | G06Q 30/02 |
| | | | | 705/14.17 |
| 2012/0191525 | A1* | 7/2012 | Singh | G06Q 20/405 |
| | | | | 705/14.27 |
| 2013/0282467 | A1* | 10/2013 | Postrel | G07F 17/3255 |
| | | | | 705/14.27 |
| 2014/0108263 | A1 | 4/2014 | Ortiz et al. | |
| 2014/0278894 | A1* | 9/2014 | Toumayan | G06Q 30/0227 |
| | | | | 705/14.28 |
| 2016/0253663 | A1* | 9/2016 | Clark | G06Q 20/3274 |
| | | | | 705/75 |
| 2016/0283941 | A1 | 9/2016 | Andrade | |
| 2016/0292672 | A1 | 10/2016 | Fay et al. | |
| 2016/0342977 | A1* | 11/2016 | Lam | G06Q 20/0658 |
| 2016/0342989 | A1 | 11/2016 | Davis | |
| 2017/0017936 | A1 | 1/2017 | Bisikalo et al. | |
| 2017/0024759 | A1* | 1/2017 | Taneja | G06Q 20/34 |
| 2017/0046664 | A1* | 2/2017 | Haldenby | G06Q 50/18 |
| 2017/0132626 | A1* | 5/2017 | Kennedy | G06Q 20/401 |
| 2017/0140408 | A1* | 5/2017 | Wuehler | G06Q 30/0207 |
| 2017/0236143 | A1 | 8/2017 | Code | |
| 2017/0286951 | A1 | 10/2017 | Ignatchenko et al. | |
| 2018/0025442 | A1 | 1/2018 | Isaacson et al. | |
| 2018/0064645 | A1 | 3/2018 | Greenspoon | |
| 2018/0068130 | A1* | 3/2018 | Chan | G06F 21/64 |
| 2018/0089645 | A1 | 3/2018 | McDonald et al. | |
| 2018/0191503 | A1* | 7/2018 | Alwar | H04L 9/14 |
| 2019/0156363 | A1* | 5/2019 | Postrel | H04L 67/04 |
| 2019/0180276 | A1* | 6/2019 | Lee | H04L 9/3247 |
| 2019/0197510 | A1* | 6/2019 | Guiney | H04L 67/104 |
| 2019/0327218 | A1* | 10/2019 | Altenhofen | H04L 63/0471 |

OTHER PUBLICATIONS

International Search Report and Written Opinion dated PCT/US2018/047640.
Sastry Durvasula, et al., U.S. Appl. No. 15/728,086, filed Oct. 9, 2017, titled "Systems and Methods for Loyalty Point Distribution".
Vasudevan Swamidurai, U.S. Appl. No. 15/956,982, filed Apr. 19, 2018, titled "Reward Point Redemption for Cryptocurrency".
International Search Report and Written Opinion dated Jun. 13, 2019 in No. PCT/US2019/022798.
International Search Report and Written Opinion dated Jun. 28, 2019 in No. PCT/US2019/26818.
Non-final Office Action dated Sep. 6, 2019 in U.S. Appl. No. 15/728,086.

* cited by examiner

REWARD POINT TRANSFERS USING BLOCKCHAIN

FIELD

This disclosure generally relates to reward points, and more particularly, to systems and methods for fraud management of reward point transfers using a distributed ledger.

BACKGROUND

Transaction account issuers often reward account holders for utilizing their transaction accounts. For example, transaction account issuers may provide points (e.g., loyalty points, membership points, reward points, etc.) corresponding to an amount spent or number of transactions utilizing a transaction account. The points may be used for travel, redeemed for cash, used to buy gift cards, or other items, and/or transferred to one or more rewards partners (e.g., loyalty programs hosted by airlines, hotels, etc.). Point transfers to a rewards partner may take seconds, days, weeks, or months to complete, based on the technical capabilities of each individual rewards partner. Point transfers are also typically not recorded and not acknowledged on a common ledger between the transaction account issuer and the rewards partner. Due at least partially to the delay in transferring points and the lack of a common ledger or acknowledgment system, fraud may occur in response to a transaction account holder claiming that points were incorrectly transferred and/or not received by the rewards partner.

SUMMARY

A system, method, and computer readable medium (collectively, the "system") is disclosed for reward point transfers using blockchain. The system may receive, by a first transfer blockchain node in a blockchain network, an encrypted rewards transfer message and a rewards transfer message hash. The encrypted rewards transfer message may comprise a points transfer amount and a user rewards account partner identifier. The rewards transfer message hash may be based on the rewards transfer message. The encrypted rewards transfer message may be encrypted using a rewards partner public key and a transaction network private key. The system may write the rewards transfer message hash and the encrypted rewards transfer message to a transfer blockchain. The system may propagate the rewards transfer message hash and the encrypted rewards transfer message to the blockchain network.

In various embodiments, a second transfer blockchain node in the blockchain network may retrieve the rewards transfer message hash and the encrypted rewards transfer message from the transfer blockchain. The second transfer blockchain node may be associated with a rewards partner system, and wherein the rewards partner system retrieves the rewards transfer message hash and the encrypted rewards transfer message from the second transfer blockchain node. The rewards partner system may decrypt the encrypted rewards transfer message using a rewards partner private key and a transaction network public key, generates a second rewards transfer message hash based on the decrypted rewards transfer message, and determines whether the second rewards transfer message hash matches the first rewards transfer message hash. The rewards partner system may generate a rewards transfer response message comprising the user rewards account partner identifier and a transfer status, generates a rewards transfer response message hash based on the rewards transfer response message, and encrypts the rewards transfer response message using the rewards partner private key and the transaction network public key. The second transfer blockchain node may receive the encrypted rewards transfer response message and the rewards transfer response message hash from the rewards partner system, write the encrypted rewards transfer response message and the rewards transfer response message hash to the transfer blockchain, and propagate the encrypted rewards transfer response message and the rewards transfer response message hash to the blockchain network.

In various embodiments, a computer-based system for transferring reward points is disclosed. The computer-based system may comprise a processor and a tangible, non-transitory memory configured to communicate with the processor. The tangible, non-transitory memory may be configured to communicate with the processor, the tangible, non-transitory memory having instructions stored thereon that, in response to execution by the processor, cause a transaction network to perform operations comprising: receiving, by the transaction network, a rewards transfer request comprising a user transaction account identifier, a points transfer amount, a rewards partner identifier, and a user rewards partner account identifier; generating, by the transaction network, a rewards transfer message comprising the points transfer amount and the user rewards partner account identifier; generating, by the transaction network, a rewards transfer message hash based on the rewards transfer message; encrypting, by the transaction network, the rewards transfer message using a rewards partner public key and a transaction network private key; and transmitting, by the transaction network, the rewards transfer message hash and the encrypted rewards transfer message to a blockchain node for writing to a transfer blockchain.

In various embodiments, the operations may also comprise updating, by the transaction network in electronic communication with a rewards database, a user points balance based on the rewards transfer request. The operations may also comprise appending, by the transaction network, the rewards partner public key to the encrypted rewards transfer message and the rewards transfer message hash. The operations may also comprise retrieving, by the transaction network in electronic communication with the blockchain node, an encrypted rewards transfer response message and a rewards transfer response message hash from the transfer blockchain. The encrypted rewards transfer response message may be encrypted using a rewards partner private key and a transaction network public key, and the encrypted rewards transfer response message and the rewards transfer response message hash may be written to the transfer blockchain by a rewards partner in response to the rewards partner retrieving the rewards transfer message hash and the encrypted rewards transfer message from the transfer blockchain. The operations may also comprise decrypting, by the transaction network, the encrypted rewards transfer response message using the rewards partner public key and a transaction network private key. The operations may also comprise generating, by the transaction network, a second rewards transfer response message hash based on the decrypted rewards transfer response message; and comparing, by the transaction network, the second rewards transfer response message hash to the rewards transfer response message hash. The blockchain node may be configured to propagate the rewards transfer message hash and the encrypted rewards transfer message to a second blockchain node in a blockchain network.

In various embodiments, a method for receiving reward point transfers from a transaction network is disclosed. The method may comprise: retrieving, by a rewards partner system in electronic communication with a blockchain node, a rewards transfer message hash and an encrypted rewards transfer message from a transfer blockchain; decrypting, by the rewards partner system, the encrypted rewards transfer message using a rewards partner private key and a transaction network public key, wherein the decrypted rewards transfer message comprises a points transfer amount and a user rewards partner account identifier; generating, by the rewards partner system, a rewards transfer response message comprising the user rewards partner account identifier and a transfer status; generating, by the rewards partner system, a rewards transfer response message hash based on the rewards transfer response message; encrypting, by the rewards partner system, the rewards transfer response message using the rewards partner private key and the transaction network public key; and transmitting, by the rewards partner system, the rewards transfer response message hash and the encrypted rewards transfer response message to the blockchain node for writing to the transfer blockchain.

In various embodiments, the method may also comprise generating, by the rewards partner system, a second rewards transfer message hash based on the decrypted rewards transfer message; and comparing, by the rewards partner system, the second rewards transfer message hash to the rewards transfer message hash. The rewards partner system retrieves the rewards transfer message hash and the encrypted rewards transfer message by querying the transfer blockchain based on the rewards partner public key. The method may also comprise updating, by the rewards partner system, a user rewards partner account balance associated with the user rewards partner account identifier based on the points transfer amount. The method may also comprise appending, by the rewards partner system, the transaction network public key to the encrypted rewards transfer response message and the rewards transfer response message hash. The blockchain node may be configured to propagate the rewards transfer response message hash and the encrypted rewards transfer response message to a second blockchain node in a blockchain network.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
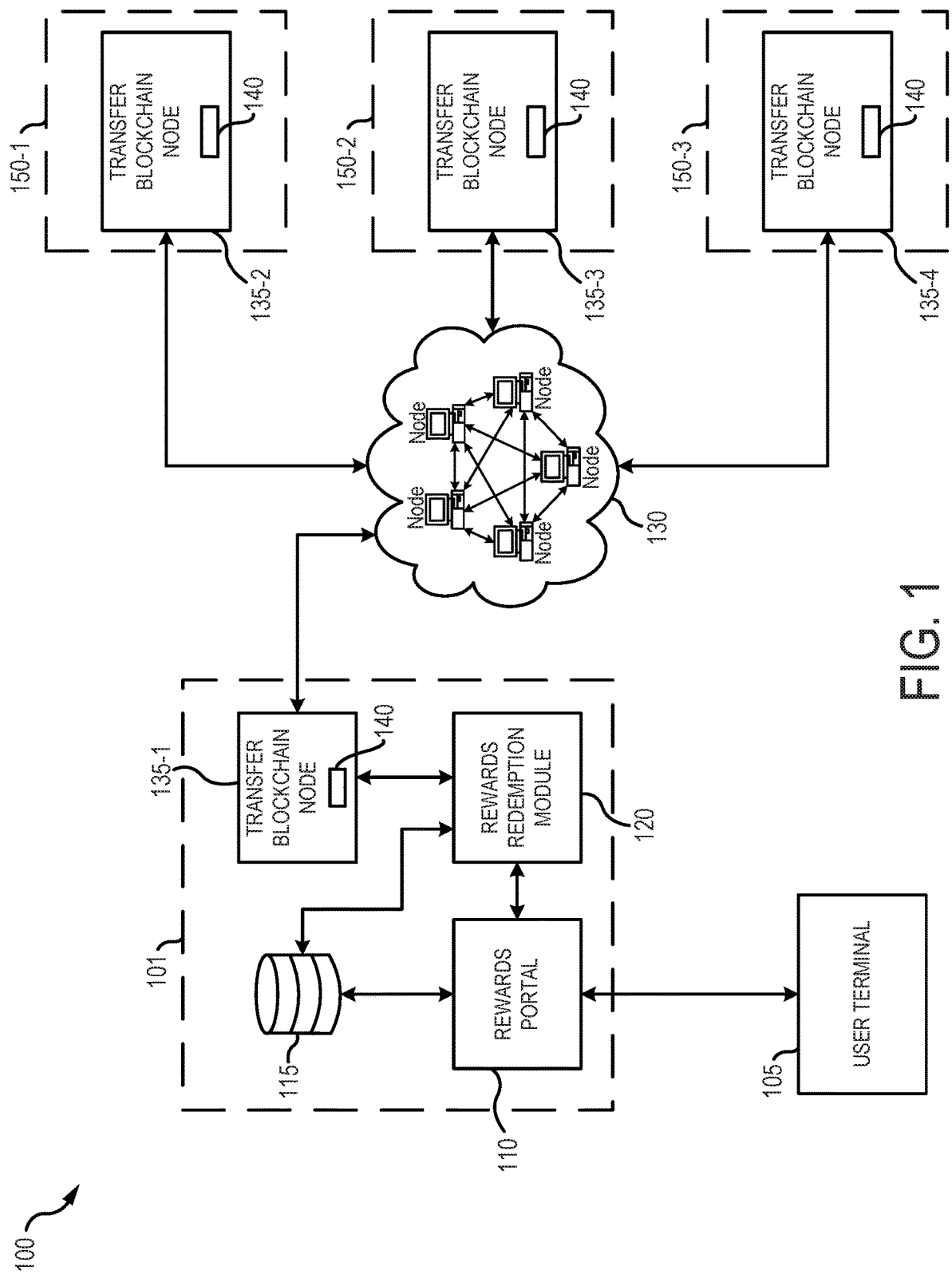
FIG. 1 is a block diagram illustrating an exemplary system for reward points transfers using blockchain, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may be used to facilitate the transfer of reward points from a transaction account issuer system to one or more rewards partner systems. For example, a blockchain driven reward points transfer system may allow transaction account issuers, rewards partners, transaction account holders, and any other network, system, or entity participating in the reward points transfer to write transfer messages to the blockchain to create an immutable record of reward points transfers. For example, transaction account issuers may write reward points transfer messages to the blockchain comprising data indicating the amount of reward points being transferred and the rewards partner the transfer is going to. The rewards partner may retrieve the reward points transfer message from the blockchain and write a reward points transfer response message to the blockchain comprising data indicating whether the transfer was successful.

In that regard, the blockchain driven reward points transfer system may provide a technical solution to the problem of customer fraud caused by the delay in transferring points and the lack of common ledger or acknowledgment system between the parties. The blockchain driven network may also enable instant or near-instant reward points transfers, as discussed further herein. The system may also enable visibility transparency between transaction account issuers and rewards partners wherein each party can view data concerning reward points transfers, including the current status of the transfer.

The systems, methods, and computer readable mediums (collectively, the "system") described herein, in accordance with various embodiments, may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

The system may manage, validate, and/or keep track of rewards transfer messages and/or rewards transfer response messages to ensure that reward points are being transferred accurately and timely. Data transfers (e.g., rewards transfer messages and/or rewards transfer response messages) performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times and the speed of reward points transfers in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of reward point transfers by performing cryptographic processes on rewards transfer messages and/or rewards transfer response messages prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, and U.S. application Ser. No. 15/824,513 titled TRANSACTION AUTHORIZATION PROCESS USING BLOCKCHAIN and filed on Nov. 28, 2017, the contents of which are each incorporated by reference in its entirety.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a system 100 for reward points transfers using blockchain is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 based on a blockchain, as described herein, may simplify and automate reward points transfers and related processes by using the blockchain as a distributed and tamper-proof data store. Transparency is very high for various embodiments using a federated or public blockchain since validation is performed, for example, using data stored by a decentralized autonomous organization (DAO) instead of a specific financial institution.

In various embodiments, system 100 may comprise a user terminal 105 in electronic communication with transaction network 101. User terminal 105 may comprise any suitable hardware, software, and/or database components capable of sending, receiving, and storing data. For example, user terminal 105 may comprise a personal computer, personal digital assistant, cellular phone, smartphone (e.g., IPHONE®, BLACKBERRY®, and/or the like), Internet of things (IoT) device, kiosk, and/or the like. User terminal 105 may comprise an operating system, such as, for example, a WINDOWS® mobile operating system, an ANDROID® operating system, APPLE® IOS®, a BLACKBERRY® operating system, and the like. User terminal 105 may comprise software components installed on user terminal 105 and configured to allow a user, via user terminal 105, access to a rewards portal 110 in transaction network 101.

For example, user terminal 105 may comprise a web browser (e.g., MICROSOFT INTERNET EXPLORER®, GOOGLE CHROME®, etc.), an application, a micro-app or mobile application, or the like, configured to allow a user to access and interact with rewards portal 110.

In various embodiments, transaction network 101 may comprise or interact with a traditional account payment network to facilitate purchases and payments, authorize transactions and/or settle transactions. For example, transaction network 101 may represent existing proprietary networks that presently accommodate transactions for credit cards, debit cards, and/or other types of transaction accounts or transaction instruments. Transaction network 101 may be a closed network that is secure from eavesdroppers. In various embodiments, transaction network 101 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Transaction network 101 may include systems and databases related to financial and/or transaction systems and processes, such as, for example, one or more authorization engines, authentication engines and databases, settlement engines and databases, accounts receivable systems and databases, an accounts payable systems and databases, and/or the like. For example, transaction network 101 may authorize and settle payment transactions; maintain transaction account member databases, accounts receivable databases, accounts payable databases, or the like; and issue reward points based on payment transactions (e.g., transaction account holders may earn a specified numbers of reward points based on the monetary value of each payment transaction, such as, for example, 1 reward point for each dollar of the payment transaction).

In various embodiments, transaction network 101 may comprise one or more network environments, servers, computer-based systems, processors, databases, and/or the like. In various embodiments, transaction network 101 may be computer based, and may comprise a processor, a tangible non-transitory computer-readable memory, and/or a network interface, along with other suitable system software and hardware components. Instructions stored on the tangible non-transitory memory may allow transaction network 101 to perform various functions, as described herein. In various embodiments, transaction network 101 may comprise one or more of a rewards portal 110, a rewards database 115, a rewards redemption module 120, and/or a transfer blockchain node 135-1. The rewards portal 110, rewards database 115, rewards redemption module 120, and/or a transfer blockchain node 135-1, and any other components described herein (e.g., transfer inquiry API 260, with brief reference to FIG. 2) may be in direct logical communication with each other via a bus, network, and/or through any other suitable means, or may be individually connected as described further herein.

In various embodiments, rewards portal 110 may be configured as a central hub to access various modules and databases of transaction network 101, as discussed further herein. A user, via user terminal 105, may access rewards portal 110 to view a user points balance, view reward point offers, and/or to use the reward points. For example, reward points may be used to pay for purchases, reimburse completed purchases, or book travel; redeemed for gift cards or other rewards; transferred to a rewards partner (e.g., rewards partner 150-1, 150-2, 150-3); and/or the like. Rewards portal 110 may comprise any suitable combination of hardware, software, databases, or the like. For example, rewards portal 110 may comprise a computer-based system, processor, or the like capable of receiving and transmitting data, performing various operations, and/or instructing various transaction network 101 components as discussed further herein. Rewards portal 110 may provide a user interface ("UI") accessible via user terminal 105. The UI may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like. The user, via user terminal 105 and the UI, may enter user credentials (e.g., a username and password, biometric input, etc.) to access rewards point data corresponding to the user (e.g., the user's transaction account).

In that regard, rewards portal 110 may be in electronic and/or logical communication with a rewards database 115. Rewards database 115 may comprise any suitable type of database, and may store, maintain, and retrieve data using any suitable technique described herein or known in the art. Rewards database 115 may be configured to store and maintain data regarding reward points, such as, for example, a user points balance, a ledger of reward points earned, a ledger of reward points used, and the like. Each data entry may comprise metadata, notes, tags, or the like indicating a user identifier (e.g., user name, transaction account number, etc.) associated with the data. Rewards portal 110 may be configured to retrieve and update data in rewards database 115, in response to changes in user reward points (e.g., reward points earned, reward points spent, redeemed, or transferred, etc.).

In various embodiments, rewards redemption module 120 may be in electronic and/or logical communication with rewards portal 110, rewards database 115, and/or transfer blockchain node 135-1. Rewards redemption module 120 may comprise any suitable combination of hardware, software, databases, or the like. For example, rewards redemption module 120 may comprise a computer-based system, processor, or the like capable of receiving and transmitting data, performing various operations, and/or instructing various transaction network 101 components as discussed further herein.

Rewards redemption module 120 may be configured to receive a rewards transfer request, query and update rewards database 115 based on the rewards transfer request, and transmit instructions to transfer blockchain node 135-1 to write data regarding the rewards transfer request to transfer blockchain 140. In various embodiments, rewards redemption module 120 may also be configured to perform cryptographic and hashing operations on the rewards transfer request before writing the data to transfer blockchain 140. For example, and as discussed further herein, rewards redemption module 120 may be configured to generate a rewards transfer message hash based on the rewards transfer request using any cryptographic hash function such as, for example, SHA-1, SHA-256, checksum, or MD5. Rewards redemption module 120 may also be configured to encrypt the rewards transfer message using a public key associated with the rewards partner 150-1, 150-2, 150-3 designated to receive the reward points transfer and a private key from the transaction network, as discussed further herein.

In various embodiments, transfer blockchain node 135-1 (e.g., a consensus participant) may be configured to allow transaction network 101 access to transfer blockchain 140. Transfer blockchain node 135-1 may be configured to maintain a copy of transfer blockchain 140, write and/or retrieve blocks from transfer blockchain 140, and/or validate blocks of transfer blockchain 140. Transfer blockchain node 135-1 may communicate with one or more transfer blockchain nodes (e.g., transfer blockchain node 135-2, 135-3, 135-4) to validate and write blocks to transfer blockchain 140, and to establish consensus between the transfer blockchain nodes based on proof of work, proof of stake, practical byzantine fault tolerance, delegated proof of stake, or other suitable consensus algorithms.

In various embodiments, each transfer blockchain node (e.g., transfer blockchain nodes 135-1, 135-2, 135-3, 135-4) may be in electronic and/or logical communication via blockchain network 130. Blockchain network 130 may be a blockchain network or peer-to-peer network that is private, consortium and/or public in nature (e.g., ETHEREUM®, Bitcoin, HYPERLEDGER® Fabric, etc.). Consortium and private networks may offer improved control over the content of transfer blockchain 140 and public networks may leverage the cumulative computing power of the network to improve security. The blockchain network 130 may comprise various transfer blockchain nodes in electronic communication with each other, as discussed further herein.

Each transfer blockchain node 135-1, 135-2, 135-3, 135-4 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. Transfer blockchain nodes 135-1, 135-2, 135-3, 135-4 may run applications to interact with transfer blockchain 140, communicate with other devices, perform crypto operations, and otherwise operate within system 100. For example, each transfer blockchain node 135-1, 135-2, 135-3, 135-4 may run a client application that can be a thin client (web), a hybrid (i.e., web and native, such as iOS and Android), or a native application to make application programming interface (API) calls to interact with transfer blockchain 140, such as a web3 API compatible with blockchain databases maintained by ETHEREUM®.

In various embodiments, transfer blockchain 140 may be a distributed ledger that maintains records in a readable manner and that is resistant to tampering. Transfer blockchain 140 may be based on blockchain technologies such as, for example, ETHEREUM®, Open Chain, Chain Open Standard, HYPERLEDGER® Fabric, CORDA CONNECT®, INTEL® Sawtooth, etc. Transfer blockchain 140 may comprise a ledger of interconnected blocks containing data. Each block may link to the previous block and may include a timestamp. Each block may hold encrypted rewards transfer messages, rewards transfer message hashes, encrypted rewards transfer response messages, rewards transfer response message hashes, and/or the like. When implemented in support of system 100, transfer blockchain 140 may serve as an immutable log for reward point transfers to a rewards partner (e.g., rewards partner 150-1, 150-2, 150-3). Transfer blockchain 140 may be maintained on various transfer blockchain nodes 135 in the form of copies of the transfer blockchain, as discussed further herein. Blocks (e.g., including encrypted rewards transfer messages, rewards transfer message hashes, encrypted rewards transfer response messages, rewards transfer response message hashes, etc.) may be written to transfer blockchain 140 by establishing consensus between the transfer blockchain nodes (e.g., transfer blockchain nodes 135-1, 135-2, 135-3, 135-4) based on proof of work, proof of stake, practical byzantine fault tolerance, delegated proof of stake, or other suitable consensus algorithms.

In various embodiments, system 100 may comprise one or more rewards partners such as, for example, rewards partner 150-1, rewards partner 150-2, and rewards partner 150-3. Rewards partners 150-1, 150-2, 150-3 may comprise any suitable entity having a membership or loyalty rewards program. For example, airlines, hotels, and similar hospitality entities may have membership programs wherein customers may earn partner reward points in response to flying on the airline, staying at the hotel, or the like. The partner reward points may be used to pay for expenses at each rewards partner (e.g., pay for a flight, hotel, etc.) or may be used for other benefits (e.g., free drinks, discounts, reward status levels, etc.). Transaction account holders that have earned reward points with transaction network 101 may desire to transfer an amount of reward points to a rewards partner for use in the reward partner's system, as discussed further herein.

In various embodiments, each rewards partner 150-1, 150-2, 150-3 may include at least one computing device in the form of a computer or processor, or a set of computers/processors, although other types of computing units or systems may be used, such as, for example, a server, web server, pooled servers, or the like. Each rewards partner 150-1, 150-1, 150-2, 150-3 may also include one or more data centers, cloud storages, or the like, and may include software, such as APIs, configured to retrieve and write data to transfer blockchain 140, via a transfer blockchain node. Although the present disclosure makes reference to rewards partner 150-1, 150-2, 150-3, it should be understood that principles of the present disclosure may be applied to a reward points transfer system having any suitable number of rewards partners interconnected to transaction network 101, and system 100 may be scaled to connect any suitable or desired number of rewards partners.

Each rewards partner 150-1, 150-2, 150-3 may comprise one or more transfer blockchain nodes (e.g., rewards partner 150-1 may comprise transfer blockchain node 135-2, rewards partner 150-2 may comprise transfer blockchain node 135-3, and rewards partner 150-3 may comprise transfer blockchain node 135-4). Transfer blockchain nodes 135-2, 135-3, 135-4 (e.g., consensus participants) may be configured to allow each respective rewards partner 150-1, 150-2, 150-3 access to transfer blockchain 140. Transfer blockchain nodes 135-2, 135-3, 135-4 may be configured to maintain a copy of transfer blockchain 140, write and/or retrieve blocks from transfer blockchain 140, and/or validate blocks of transfer blockchain 140, as discussed further herein.

A blockchain address may be uniquely assigned to each rewards partner 150-1, 150-2, 150-3 to function as a unique identifier for each respective rewards partner 150-1, 150-2, 150-3. For example, each rewards partner 150-1, 150-2, 150-3 may register with transaction network 101, and/or an existing trust participant (e.g., identity provider), and may be assigned and provided a private key and public key pair. Transaction network 101, via rewards redemption module 120, may store a mapping of public keys comprising a rewards partner identifier corresponding to each rewards partner 150-1, 150-2, 150-3 (e.g., a rewards partner ID), the associated public key, and any other desired attribute or data. The private key may be stored with each respective rewards partner 150-1, 150-2, 150-3. In that regard, and as discussed further herein, data can be encrypted by transaction network 101, via rewards redemption module 120, using the public key prior to writing to transfer blockchain 140. In response to retrieving the data from transfer blockchain 140, the associated rewards partner 150-1, 150-2, 150-3 may decrypt the data using the private key. Transaction network 101 may generate the public key and private key pair using any suitable key pair generation technique and asymmetric key algorithm. In various embodiments, transaction network 101 may use a Hierarchical Deterministic (HD) solution to enable the creation of one or more child keys from one or more parents keys in a hierarchy. Each child key may be assigned to an individual rewards partner 150-1, 150-2, 150-3. For example, transaction network 101 may use BIP32, BIP39, and/or BIP44 to generate an HD tree of public addresses.

The various communications discussed herein may be performed using a network. As used herein, the term "network" may further include any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

Figure 2:
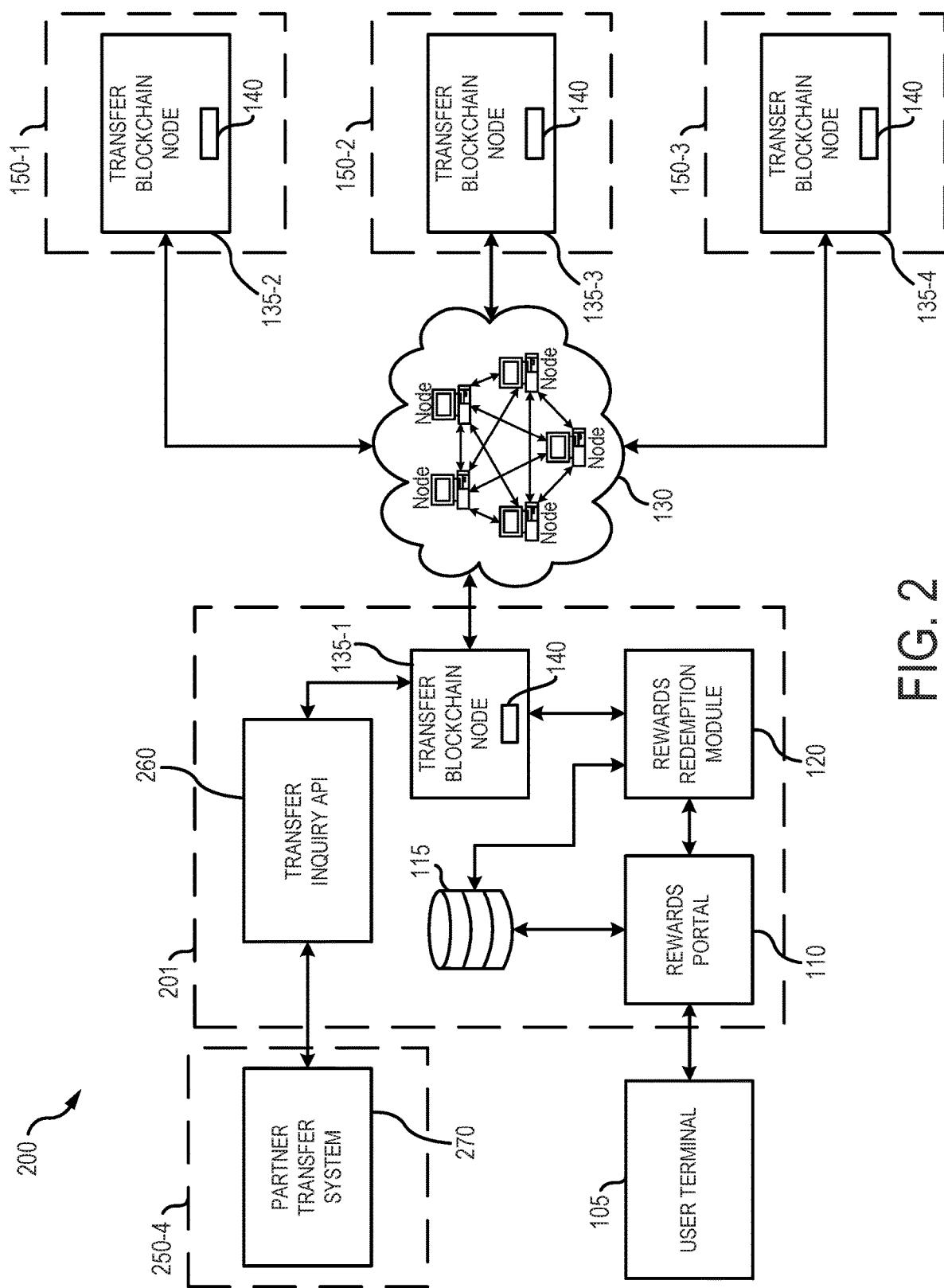
FIG. 2 is a block diagram illustrating an exemplary system for reward points transfers using blockchain including a transfer API, in accordance with various embodiments.

In various embodiments, and with reference to FIG. 2, a system 200 for reward points transfers may also include a rewards partner 250-4 configured to interact with transaction network 201 via a transfer inquiry API 260. System 200 may allow rewards partners (e.g., rewards partner 250-4) that do not have access to a transfer blockchain node to interact with transfer blockchain 140, retrieve reward points transfer messages, and transmit reward points transfer response messages.

Rewards partner 250-4 may be similar to rewards partner 150-1, 150-2, 150-3. For example, rewards partner 250-4 may comprise any suitable entity having a membership or loyalty rewards program, such as an airline, hotel, and similar hospitality entities. Rewards partner 250-4 may include at least one computing device in the form of a computer or processor, or a set of computers/processors, although other types of computing units or systems may be used, such as, for example, a server, web server, pooled servers, or the like. Rewards partner 250-4 may be assigned a unique identifier for use in system 200. For example, rewards partner 250-4 may register with transaction network 201, and/or an existing trust participant (e.g., identity provider), and may be assigned and provided a private key and public key pair. The public key may be stored with transaction network 201 (similar to the public key for rewards partners 150-1, 150-2, 150-3). The private key may be stored with rewards partner 250-4.

In various embodiments, rewards partner 250-4 may comprise a partner transfer system 270. Partner transfer system 270 may comprise any suitable combination of hardware, software, databases, or the like. Partner transfer system 270 may comprise a computer-based system, processor, or the like capable of receiving and transmitting data, performing various operations, and/or instructing various transaction network 201 components as discussed further herein.

In various embodiments, transfer inquiry API 260 may be in electronic communication with partner transfer system 270 of rewards partner 250-4 and transfer blockchain node 135-1. Transfer inquiry API 260 may be configured as an intermediary between rewards partner 250-4 and transfer blockchain node 135-1 to allow rewards partner 250-4 access to transfer blockchain 140. For example, transfer inquiry API 260 may comprise software and/or hardware components configured to allow transfer inquiry API 260 to receive instructions from partner transfer system 270, query transfer blockchain 140, via transfer blockchain node 135-1, based on the instructions and return data to partner transfer system 270, write data to transfer blockchain 140, via transfer blockchain node 135-1 based on the instructions, and/or the like. For example, in response to being invoked or called by rewards partner 250-4, via partner transfer system 270, transfer inquiry API 260 may be configured to retrieve (via transfer blockchain node 135-1) one or more reward transfer message hashes and/or encrypted reward transfer messages from transfer blockchain 140, and transfer the data to partner transfer system 270 for decryption and review, as discussed further herein. In response to receiving one or more reward transfer response message hashes and/or encrypted reward transfer responses messages from partner transfer system 270, transfer inquiry API 260 may be configured to transmit the data and instruct transfer blockchain node 135-1 to write the data to transfer blockchain 140.

Referring now to FIGS. 2-5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3-5, but also to the various system components as described above with reference to FIGS. 1 and 2.

Figure 3:
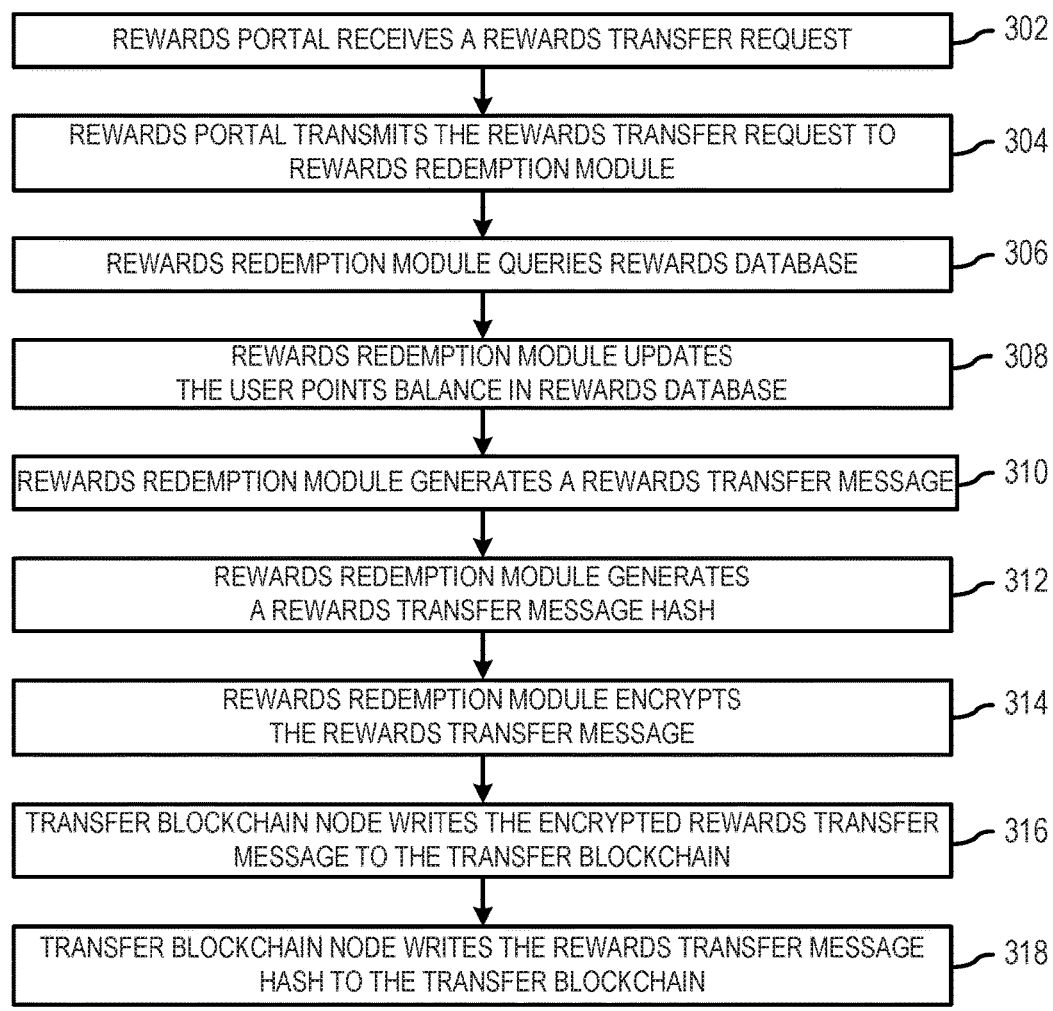
FIG. 3 illustrates a process flow for generating and writing a reward transfer message to a transfer blockchain, in accordance with various embodiments.

With specific reference to FIG. 3, and continued reference to FIG. 1, a process 301 for generating and writing a reward transfer message to a transfer blockchain is shown according to various embodiments. A user may interact with user terminal 105, via a mobile application, IoT communication, web browser, or the like, to access rewards portal 110. For example, the user may access rewards portal 110 to review a user points balance; to redeem user points for travel, cash, gift cards, or the like; and/or to initiate a rewards transfer request to transfer user reward points to a rewards partner (e.g., rewards partner 150-1, 150-2, 150-3). Rewards portal 110 receives a rewards transfer request (step 302). The rewards transfer request may comprise a user transaction account identifier (e.g., a user transaction account ID, transaction account number, etc.), a points transfer amount, a user rewards partner account identifier (e.g., a username or ID the user associated with the user's rewards account at the rewards partner), and/or a rewards partner identifier (e.g., a rewards partner ID). Rewards portal 110 transmits the rewards transfer request to rewards redemption module 120 (step 304).

In response to receiving the rewards transfer request, rewards redemption module 120 queries rewards database 115 (step 306). Rewards redemption module 120 may query rewards database 115 based on the user identifier to determine and verify the user points balance associated with the user identifier. Rewards redemption module 120 updates the user points balance in rewards database 115 (step 308). Rewards redemption module 120 may compare the user points balance to the points transfer amount to ensure that the user points balance is sufficient to complete the rewards transfer request. Rewards redemption module 120 may update the user points balance to reflect the points transfer amount being transferred to the rewards partner.

As used herein, the transfer of points may include the system also conducting any type of conversions of points, conversions of country currencies (or monetary values) related to the points or normalization of points, such that the points have similar or equivalent value in different systems. The system may also acquire updated country currency conversion rates or updated rewards program value, prior to converting the points. For example, 10 points in one system may be equivalent to 500 points in another system. The points transfers may also include a "loan" of points to a second party, wherein the second party may eventually pay back the points to the first party.

In various embodiments, rewards redemption module 120 generates a rewards transfer message (step 310). The rewards transfer message may comprise the points transfer amount, the user rewards account partner identifier, and/or the rewards partner identifier. The rewards transfer message may also comprise a transaction ID configured as a unique identifier for each reward point transfer. Rewards redemption module 120 generates a rewards transfer message hash (step 312) based on the rewards transfer message. The rewards transfer message hash may be generated using any cryptographic hash function such as, for example, SHA-1, SHA-256, SHA-512, checksum, MD5, BLAKE2, BLAKE2B, or the like. Rewards redemption module 120 encrypts the rewards transfer message (step 314). The rewards transfer message may be encrypted using the public key associated to the specified rewards partner 150-1, 150-2, 150-3 (e.g., a rewards partner public key) and a private key from the transaction network (e.g., a transaction network private key). For example, rewards redemption module 120 may store a mapping of public keys associated to each rewards partner 150-1, 150-2, 150-3, and rewards redemption module 120 may retrieve the public key based on the rewards partner identifier identified in the rewards transfer message.

In various embodiments, rewards redemption module 120 may transfer the encrypted rewards transfer message and/or the rewards transfer message hash to transfer blockchain node 135-1. Rewards redemption module 120 may invoke transfer blockchain node 135-1 to write data to transfer blockchain 140 by transferring the encrypted rewards transfer message and/or the rewards transfer message hash to transfer blockchain node 135-1. In response to being invoked, transfer blockchain node 135-1 writes the encrypted rewards transfer message to transfer blockchain 140 (step 316), and the rewards transfer message hash to transfer blockchain 140 (step 318). In various embodiments, transfer blockchain node 135-1 may append the rewards partner public key to the encrypted rewards transfer message before writing the encrypted rewards transfer message to transfer blockchain 140. Transfer blockchain node 135-1 may also append the public key to the rewards transfer message hash before writing the rewards transfer message hash and the encrypted rewards transfer message to transfer blockchain 140. In that regard, the rewards partner 150-1, 150-2, 150-3 may retrieve associated encrypted rewards transfer messages and rewards transfer message hashes based on the public key appended to each block. In various embodiments, the encrypted rewards transfer message and the rewards transfer message hash may also be written to the blockchain as a single data entry. Transfer blockchain node 135-1 may propagate the encrypted rewards transfer message and the rewards transfer message hash to at least a second transfer blockchain node (e.g., transfer blockchain node 135-2, 135-3, 135-4) in blockchain network 130 for writing to transfer blockchain 140.

Figure 4:
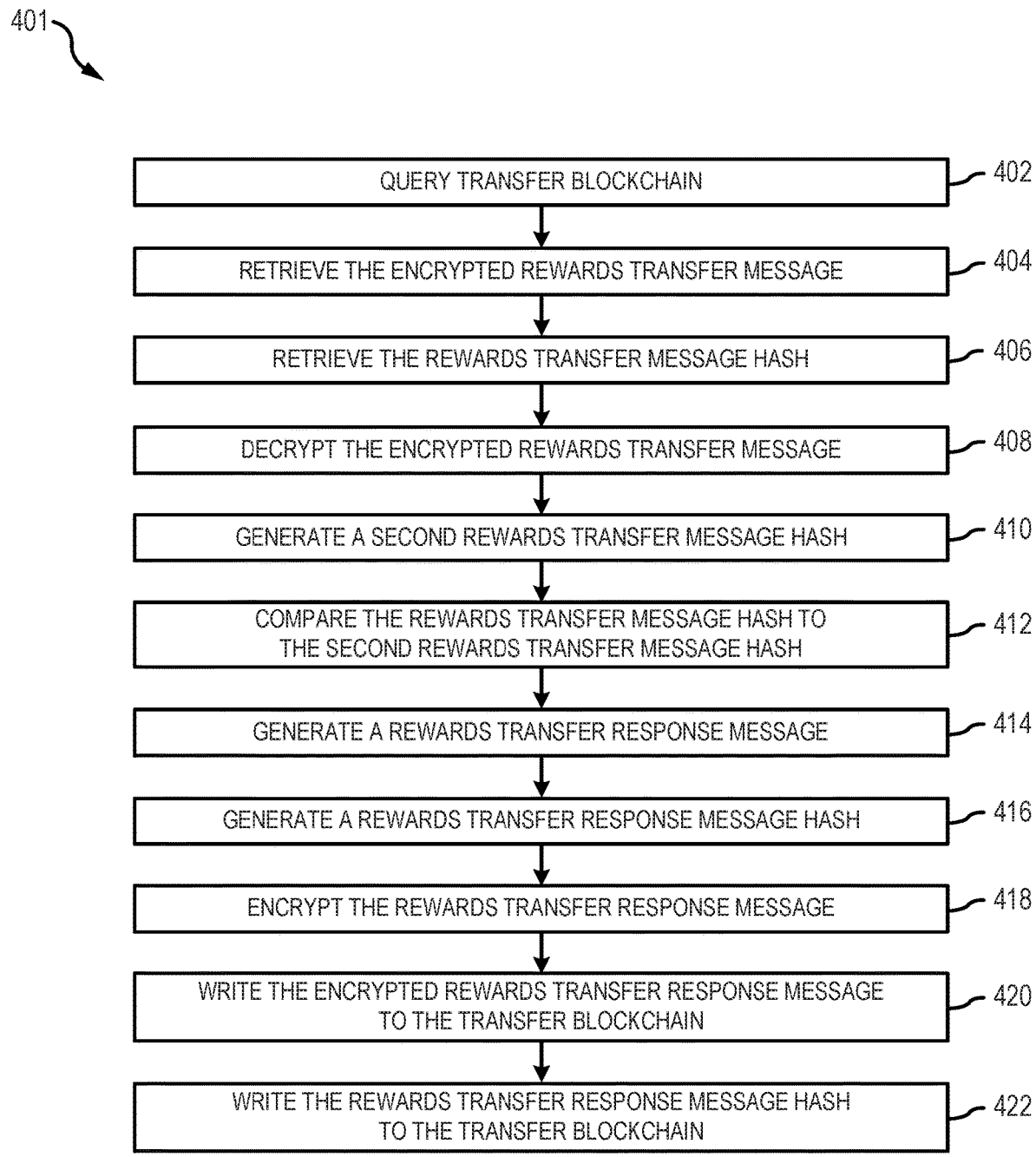
FIG. 4 illustrates a process flow for retrieving the reward transfer message from the transfer blockchain, in accordance with various embodiments.

With specific reference to FIG. 4, and continued reference to FIG. 1, a process 401 for retrieving reward transfer messages from the transfer blockchain is shown according to various embodiments. Rewards partner 150-1, 150-2, 150-3 queries transfer blockchain 140 (step 402). Rewards partner 150-1, 150-2, 150-3 may query transfer blockchain 140 via each respective transfer blockchain node 135-2, 135-3, 135-4. In various embodiments, rewards partner 150-1, 150-2, 150-3 may query transfer blockchain 140 in response to any suitable event or instruction. For example, transfer blockchain node 135-2, 135-3, 135-4 may be configured to transmit a transfer notification to each corresponding rewards partner 150-1, 150-2, 150-3 in response to a block being added to transfer blockchain 140. In that respect, rewards partner 150-1, 150-2, 150-3 may query transfer blockchain 140 in response to a block being added to transfer blockchain 140. Rewards partner 150-1, 150-2, 150-3 may also query transfer blockchain 140 based on a designated time interval (e.g., every ten minutes, hour, day, etc.). Rewards partner 150-1, 150-2, 150-3 may also comprise an API or software application configured to monitor transfer blockchain 140 for new writes.

In various embodiments, rewards partner 150-1, 150-2, 150-3 retrieves the encrypted rewards transfer message (step 404) and the rewards transfer message hash (step 406). Rewards partner 150-1, 150-2, 150-3 may query transfer blockchain 140 based on the public key associated with each respective rewards partner 150-1, 150-2, 150-3. Rewards partner 150-1, 150-2, 150-3, via the respective transfer blockchain node 135-2, 135-3, 135-4, may retrieve each encrypted rewards transfer message and rewards transfer message hash having an appended public key matching the provided public key. Rewards partner 150-1, 150-2, 150-3 may identify the encrypted rewards transfer message and rewards transfer message hash as being associated based on the unique transaction ID.

In various embodiments, rewards partner 150-1, 150-2, 150-3 decrypts the encrypted rewards transfer message (step

408). Rewards partner 150-1, 150-2, 150-3 may decrypt the encrypted rewards transfer message using the private key from the asymmetric key pair (e.g., the rewards partner private key) and the public key associated with transaction network 101 (e.g., the transaction network public key. In that respect, the encrypted rewards transfer message may only be decrypted by the rewards partner 150-1, 150-2, 150-3 associated with the public key used to encrypt the rewards transfer message (e.g., in step 314, with brief reference to FIG. 3).

In various embodiments, rewards partner 150-1, 150-2, 150-3 generates a second rewards transfer message hash (step 410) based on the decrypted rewards transfer message. The second rewards transfer message hash may be generated using any cryptographic hash function such as, for example, SHA-1, SHA-256, checksum, or MD5. The second rewards transfer message hash may be generated using the same cryptographic hash function used to generate the rewards transfer message hash (e.g., step 312, with brief reference to FIG. 3). Rewards partner 150-1, 150-2, 150-3 compares the (first) rewards transfer message hash to the second rewards transfer message hash (step 412). Rewards partner 150-1, 150-2, 150-3 may compare the (first) rewards transfer message hash to the second rewards transfer message hash to determine whether the (first) rewards transfer message hash matches the second rewards transfer message hash. In response to the (first) rewards transfer message hash matching the second rewards transfer message hash, rewards partner 150-1, 150-2, 150-3 may be ensured that the rewards transfer message written to transfer blockchain 140 (e.g., in step 316, with brief reference to FIG. 3) was not tampered with or modified before being retrieved in step 404. In response to the (first) rewards transfer message hash not matching the second rewards transfer message hash, rewards partner 150-1, 150-2, 150-3 may be noticed that the rewards transfer message written to transfer blockchain 140 (e.g., in step 316, with brief reference to FIG. 3) was tampered with or modified before being retrieved in step 404.

In various embodiments, rewards partner 150 generates a rewards transfer response message (step 414). The rewards transfer response message may comprise the user rewards account partner identifier, the rewards partner identifier, and/or a transfer status. The rewards transfer response message may also comprise the unique transaction ID. The transfer status may comprise data indicating the status of the rewards transfer request, such as, for example, "transfer complete," "transfer failed," "transfer pending," "transfer pending for 10 days," and/or any other suitable status message. For example, the rewards point transfer may fail in response to the user not having a rewards account established with the rewards partner 150-1, 150-2, or 150-3, in response to the rewards partner 150-1, 150-2, or 150-3 detecting fraud, and/or the like.

Rewards partner 150-1, 150-2, or 150-3 generates a rewards transfer response message hash (step 416) based on the rewards transfer response message. The rewards transfer response message hash may be generated using any cryptographic hash function such as, for example, SHA-1, SHA-256, SHA-512, checksum, or MD5. Rewards partner 150-1, 150-2, or 150-3 encrypts the rewards transfer response message (step 418). The rewards transfer response message may be encrypted using the rewards partner private key and the transaction network public key.

In various embodiments, rewards partner 150-1, 150-2, or 150-3 writes the encrypted rewards transfer response message to transfer blockchain 140 (step 420) and the rewards transfer response message hash to transfer blockchain 140 (step 422). Rewards partner 150-1, 150-2, or 150-3 may invoke transfer blockchain node 135-2, 135-3, 135-4 to write data to transfer blockchain 140 by transferring the encrypted rewards transfer response message and/or the rewards transfer response message hash to transfer blockchain node 135-1. In response to being invoked, transfer blockchain node 135-1, 135-2, 135-3 writes the encrypted rewards transfer response message and/or the rewards transfer response message hash to transfer blockchain 140. In various embodiments, transfer blockchain node 135-1 may append the transaction network public key to the encrypted rewards transfer response message before writing the encrypted rewards transfer response message to transfer blockchain 140. Transfer blockchain node 135-1 may also append the transaction network public key to the rewards transfer response message hash before writing the rewards transfer response message hash and the encrypted rewards transfer response message to transfer blockchain 140. In that regard, transaction network 101 may retrieve associated encrypted rewards transfer response messages and rewards transfer response message hashes based on the public key appended to each block. In various embodiments, the encrypted rewards transfer response message and the rewards transfer response message hash may also be written to the blockchain as a single data entry. Transfer blockchain node 135-1, 135-2, 135-3 may propagate the encrypted rewards transfer response message and the rewards transfer response message hash to at least a second transfer blockchain node (e.g., transfer blockchain node 135-2, 135-3, 135-4) in blockchain network 130 for writing to transfer blockchain 140.

In various embodiments, transaction network 101 may retrieve the encrypted rewards transfer response message and rewards transfer response message hash, and may decrypt the encrypted rewards transfer response message and generate a second rewards transfer response message hash similar to in steps 408, 410, and 412.

Figure 5:
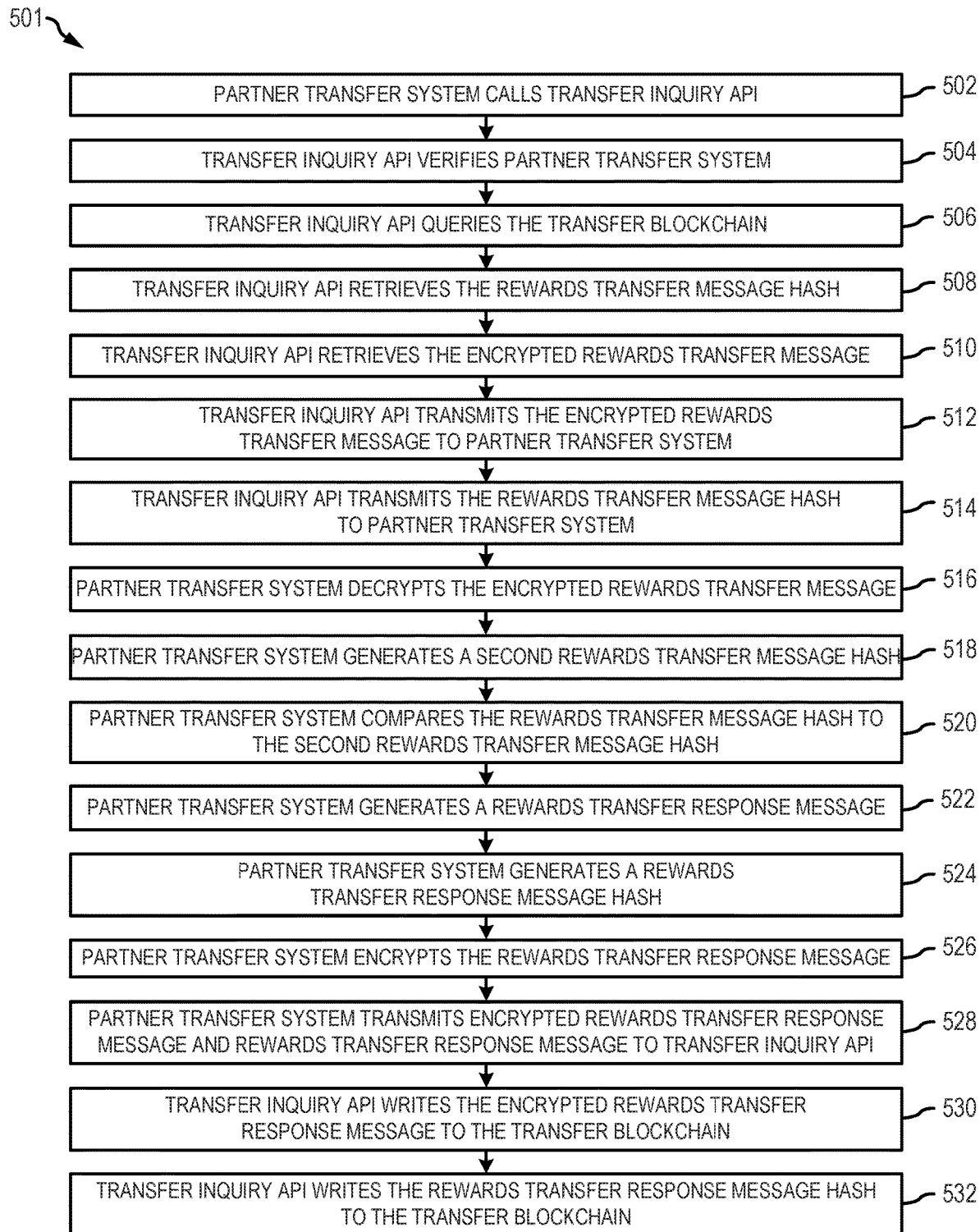
FIG. 5 illustrates a process flow for retrieving the reward transfer message from the transfer blockchain using a transfer API, in accordance with various embodiments.

With specific reference to FIG. 5, and continued reference to FIG. 2, a process 501 for retrieving the reward transfer message from the transfer blockchain using a transfer API is shown according to various embodiments. Partner transfer system 270 calls transfer inquiry API 260 (step 502). Partner transfer system 270 may call or invoke transfer inquiry API 260 to initiate retrieval of rewards transfer messages from transfer blockchain 140. Partner transfer system 270 may call transfer inquiry API 260 by passing the public key associate with the rewards partner 250-4. Partner transfer system 270 may call transfer inquiry API 260 in response to any suitable event and/or based on a designated call interval (e.g., every ten minutes, hour, day, etc.). Transfer inquiry API 260 verifies partner transfer system 270 (step 504). For example, transfer inquiry API 260 may verify that the public key was previously registered with transaction network 201. Transfer inquiry API 260 may also verify a rewards partner ID associated with the rewards partner 250-4, and/or through any other suitable method.

Transfer inquiry API 260 queries transfer blockchain 140 (step 506). Transfer inquiry API 260 may instruct transfer blockchain node 135-1 to query transfer blockchain 140 based on the public key provided in step 502. Transfer inquiry API 260 retrieves the rewards transfer message hash (step 508) and the encrypted rewards transfer message (step 510). Transfer inquiry API 260, via transfer blockchain node 135-1, may retrieve each encrypted rewards transfer message and rewards transfer message hash having an appended public key matching the public key provided by rewards partner 250-4. Transfer inquiry API 260 transmits the encrypted rewards transfer message to partner transfer system 270 (step 512) and transmits the rewards transfer message hash to partner transfer system 270 (step 514).

In various embodiments, partner transfer system 270 decrypts the encrypted rewards transfer message (step 516). Partner transfer system 270 may decrypt the encrypted rewards transfer message using the rewards partner private key from the asymmetric key pair and the transaction network public key (e.g., similar to step 408, with brief reference to FIG. 4).

In various embodiments, partner transfer system 270 generates a second rewards transfer message hash (step 518) based on the decrypted rewards transfer message. The second rewards transfer message hash may be generated using any cryptographic hash function such as, for example, SHA-1, SHA-256, checksum, or MD5 (e.g., similar to step 410, with brief reference to FIG. 4). The second rewards transfer message hash may be generated using the same cryptographic hash function used to generate the rewards transfer message hash (e.g., step 312, with brief reference to FIG. 3). Partner transfer system 270 compares the (first) rewards transfer message hash to the second rewards transfer message hash (step 520). Partner transfer system 270 may compare the (first) rewards transfer message hash to the second rewards transfer message hash to determine whether the (first) rewards transfer message hash matches the second rewards transfer message hash (e.g., similar to step 412, with brief reference to FIG. 4).

Partner transfer system 270 generates a rewards transfer response message (step 522). The rewards transfer response message may be generated similar to step 414, with brief reference to FIG. 4. The rewards transfer response message may comprise the user rewards account partner identifier, the rewards partner identifier, and/or a transfer status. The rewards transfer response message may also comprise the unique transaction ID. The transfer status may comprise data indicating the status of the rewards transfer request, such as, for example, "transfer complete," "transfer failed," "transfer pending," "transfer pending for 10 days," and/or any other suitable status message.

In various embodiments, partner transfer system 270 generates a rewards transfer response message hash (step 524) based on the rewards transfer response message. The rewards transfer response message may be generated using any cryptographic hash function such as, for example, SHA-1, SHA-256, SHA-512, checksum, or MD5 (e.g., similar to step 416, with brief reference to FIG. 4). Partner transfer system 270 encrypts the rewards transfer response message (step 526). The rewards transfer response message may be encrypted using the rewards partner private key and the transaction network public key (e.g., similar to step 418, with brief reference to FIG. 4).

Partner transfer system 270 transmits the encrypted rewards transfer response message and the rewards transfer response message hash to transfer inquiry API 260 (step 528). In response to receiving the data, transfer inquiry API 260 writes the encrypted rewards transfer response message to transfer blockchain 140 (step 530), and writes the rewards transfer response message hash to transfer blockchain 140 (step 532). For example, transfer API may invoke transfer blockchain node 135-1 to write data to transfer blockchain 140 by transferring the encrypted rewards transfer response message and/or the rewards transfer response message hash to transfer blockchain node 135-1 (e.g., similar to step 420 and step 422, with brief reference to FIG. 4). In response to being invoked, transfer blockchain node 135-1 writes the encrypted rewards transfer response message and/or the rewards transfer response message hash to transfer blockchain 140. In various embodiments, the encrypted rewards transfer response message and the rewards transfer response message hash may also be written to the blockchain as a single data entry. Transfer blockchain node 135-1, 135-2, 135-3 may propagate the encrypted rewards transfer response message and the rewards transfer response message hash to at least a second transfer blockchain node (e.g., transfer blockchain node 135-2, 135-3, 135-4) in blockchain network 130 for writing to transfer blockchain 140.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The computer system (e.g., user terminal 105) or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, 0S2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3-5, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of transferring reward points, but the disclosure and claims include specific rules for implementing the outcome of transferring reward points and that render information into a specific format that is then used and applied to create the desired results of transferring reward points, as set forth in *McRO, Inc. v. Bandai Namco Games America Inc.* (Fed. Cir. case number 15-1080, Sep. 13, 2016). In other words, the outcome of transferring reward points can be performed by many different types of rules and combinations of rules, and this disclosure includes various embodiments with specific rules. While the absence of complete preemption may not guarantee that a claim is eligible, the disclosure does not sufficiently preempt the field of transferring reward points at all. The disclosure acts to narrow, confine, and otherwise tie down the disclosure so as not to cover the general abstract idea of just transferring reward points. Significantly, other systems and methods exist for transferring reward points, so it would be inappropriate to assert that the claimed invention preempts the field or monopolizes the basic tools of transferring reward points. In other words, the disclosure will not prevent others from transferring reward points, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (via user terminal 105). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, reward transfer messages, reward transfer response messages, etc.) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a first transfer blockchain node in a blockchain network, an encrypted rewards transfer message and a rewards transfer message hash from a credit card transaction account issuer system,
   wherein the encrypted rewards transfer message comprises a user credit card transaction account identifier, a points transfer amount, a rewards partner identifier, and a user rewards account partner identifier,
   wherein the rewards transfer message hash is based on a rewards transfer message, and
   wherein the encrypted rewards transfer message is encrypted using a rewards partner public key and a transaction network private key;
   writing, by the first transfer blockchain node, the rewards transfer message hash and the encrypted rewards transfer message to a transfer blockchain;
   propagating, by the first transfer blockchain node, the rewards transfer message hash and the encrypted rewards transfer message to the blockchain network;
   initiating, in response to the encrypted rewards transfer message being written to the blockchain network, a transfer of reward points from a credit card transaction account of a user at a first reward loyalty program of the credit card transaction account issuer system to a rewards account of the same user at a second reward loyalty program of a rewards partner system as a loan, wherein the first reward loyalty program operates independently from the second reward loyalty program and the transferred reward points are subject to being paid back to the first reward loyalty program from the second reward loyalty program in accordance with the loan; and
   generating, by the first transfer blockchain node, a rewards transfer response message comprising the user rewards account partner identifier and a transfer status, wherein the transfer status indicates a status of the transfer of reward points as being either transfer completed, transfer failed, or transfer pending.

2. The method of claim 1, wherein a second transfer blockchain node in the blockchain network retrieves the rewards transfer message hash and the encrypted rewards transfer message from the transfer blockchain.

3. The method of claim 2, wherein the second transfer blockchain node is associated with the rewards partner system, and wherein the rewards partner system retrieves the rewards transfer message hash and the encrypted rewards transfer message from the second transfer blockchain node.

4. The method of claim 3, wherein the rewards partner system decrypts the encrypted rewards transfer message using a rewards partner private key and a transaction network public key, generates a second rewards transfer message hash based on the decrypted rewards transfer message, and determines whether the second rewards transfer message hash matches the rewards transfer message hash.

5. The method of claim 4, wherein the rewards partner system generates a rewards transfer response message hash based on the rewards transfer response message, and encrypts the rewards transfer response message using the rewards partner private key and the transaction network public key.

6. The method of claim 5, wherein the second transfer blockchain node:
   receives the encrypted rewards transfer response message and the rewards transfer response message hash from the rewards partner system,
   writes the encrypted rewards transfer response message and the rewards transfer response message hash to the transfer blockchain, and
   propagates the encrypted rewards transfer response message and the rewards transfer response message hash to the blockchain network.

7. A computer-based system for transferring reward points, comprising:
   a processor; and
   a tangible, non-transitory memory configured to communicate with the processor, the tangible, non-transitory memory having instructions stored thereon that, in response to execution by the processor, cause a transaction network to perform operations comprising:
      receiving, by the transaction network from a rewards portal, a reward transfer request to transfer rewards points from a credit card transaction account of a user to a rewards account of the same user at a rewards partner system;
      receiving, by the transaction network, the rewards transfer request from a credit card transaction account issuer system, the rewards transfer request comprising a user credit card transaction account identifier, a points transfer amount, a rewards partner identifier, and a user rewards partner account identifier;
      generating, by the transaction network, a rewards transfer message comprising the points transfer amount and the user rewards partner account identifier;
      generating, by the transaction network, a rewards transfer message hash based on the rewards transfer message;
      encrypting, by the transaction network, the rewards transfer message using a rewards partner public key and a transaction network private key;
      transmitting, by the transaction network, the rewards transfer message hash and the encrypted rewards transfer message to a blockchain node for writing to a transfer blockchain;
      initiating, in response to the encrypted rewards transfer message being written to the transfer blockchain, a transfer of reward points from a credit card transaction account of the user at a first reward loyalty program of the credit card transaction account issuer system to the rewards account of the same user at a second reward loyalty program of a rewards partner system as a loan, wherein the first reward loyalty program operates independently from the second reward loyalty program and the transferred reward points are subject to being paid back to the first reward loyalty program from the second reward loyalty program in accordance with the loan; and generating, by the transaction network, a rewards transfer response message comprising the user rewards account partner identifier and a transfer status, wherein the transfer status indicates a status of the transfer of reward points as being either transfer completed, transfer failed, or transfer pending.

8. The computer-based system of claim 7, further comprising updating, by the transaction network in electronic communication with a rewards database, a user points balance based on the rewards transfer request.

9. The computer-based system of claim 7, further comprising appending, by the transaction network, the rewards partner public key to the encrypted rewards transfer message and the rewards transfer message hash.

10. The computer-based system of claim 7, further comprising retrieving, by the transaction network in electronic communication with the blockchain node, an encrypted rewards transfer response message and a rewards transfer response message hash from the transfer blockchain.

11. The computer-based system of claim 10, wherein the encrypted rewards transfer response message is encrypted using a rewards partner private key and a transaction network public key, and wherein the encrypted rewards transfer response message and the rewards transfer response message hash is written to the transfer blockchain by a rewards partner in response to the rewards partner retrieving the rewards transfer message hash and the encrypted rewards transfer message from the transfer blockchain.

12. The computer-based system of claim 10, further comprising decrypting, by the transaction network, the encrypted rewards transfer response message using the rewards partner public key and a transaction network private key.

13. The computer-based system of claim 12, further comprising:
generating, by the transaction network, a second rewards transfer response message hash based on the decrypted rewards transfer response message; and
comparing, by the transaction network, the second rewards transfer response message hash to the rewards transfer response message hash.

14. The computer-based system of claim 7, wherein the blockchain node is configured to propagate the rewards transfer message hash and the encrypted rewards transfer message to a second blockchain node in a blockchain network.

15. A method, comprising:
retrieving, by a rewards partner system in electronic communication with a blockchain node, a rewards transfer message hash and an encrypted rewards transfer message from a transfer blockchain;
decrypting, by the rewards partner system, the encrypted rewards transfer message using a rewards partner private key and a transaction network public key, wherein the decrypted rewards transfer message comprises a user credit card transaction account identifier, a points transfer amount, a rewards partner identifier, and a user rewards partner account identifier;

generating, by the rewards partner system, a rewards transfer response message comprising the user rewards partner account identifier and a transfer status involving a transfer of reward points from a credit card transaction account of a user at a first reward loyalty program of a credit card transaction account issuer system to a rewards account of the same user at a second reward loyalty program of a rewards partner system, wherein the transfer status indicates a status of the transfer of reward points as being either transfer completed, transfer failed, or transfer pending;

generating, by the rewards partner system, a rewards transfer response message hash based on the rewards transfer response message;

encrypting, by the rewards partner system, the rewards transfer response message using the rewards partner private key and the transaction network public key;

transmitting, by the rewards partner system, the rewards transfer response message hash and the encrypted rewards transfer response message to the blockchain node for writing to the transfer blockchain and confirming, in response to the encrypted rewards transfer response message being transmitted to the blockchain node, the transfer of reward points from the credit card transaction account of the user at the first reward loyalty program of the credit card transaction account issuer system to the rewards account of the same user at the second reward loyalty program of a rewards partner system as a loan, wherein the first reward loyalty program operates independently from the second reward loyalty program and the transferred reward points are subject to being paid back to the first reward loyalty program from the second reward loyalty program in accordance with the loan.

16. The method of claim 15, further comprising:
generating, by the rewards partner system, a second rewards transfer message hash based on the decrypted rewards transfer message; and
comparing, by the rewards partner system, the second rewards transfer message hash to the rewards transfer message hash.

17. The method of claim 15, wherein the rewards partner system retrieves the rewards transfer message hash and the encrypted rewards transfer message by querying the transfer blockchain based on a rewards partner public key.

18. The method of claim 15, further comprising:
receiving, by the rewards partner system from a rewards portal, a reward transfer request to transfer rewards points from the credit card transaction account of the user to the rewards account of the same user at the rewards partner system; and
updating, by the rewards partner system, a user rewards partner account balance associated with the user rewards partner account identifier based on the points transfer amount.

19. The method of claim 15, further comprising appending, by the rewards partner system, the transaction network public key to the encrypted rewards transfer response message and the rewards transfer response message hash.

20. The method of claim 15, wherein the blockchain node is configured to propagate the rewards transfer response message hash and the encrypted rewards transfer response message to a second blockchain node in a blockchain network.

* * * * *